(12) United States Patent
Jolivet

(10) Patent No.: US 8,731,578 B2
(45) Date of Patent: May 20, 2014

(54) METHOD AND APPARATUS FOR OBTAINING LOCATION INFORMATION USING SMART CARD

(75) Inventor: Paul Jolivet, Roissy CDG Cedex (FR)

(73) Assignee: LG Electronics Inc., Seoul (KR)

( * ) Notice: Subject to any disclaimer, the term of this patent is extended or adjusted under 35 U.S.C. 154(b) by 627 days.

(21) Appl. No.: 12/642,250

(22) Filed: Dec. 18, 2009

(65) Prior Publication Data

US 2010/0167754 A1 Jul. 1, 2010

Related U.S. Application Data

(60) Provisional application No. 61/140,059, filed on Dec. 22, 2008.

(51) Int. Cl.
*H04W 24/00* (2009.01)
*H04B 1/38* (2006.01)

(52) U.S. Cl.
USPC ............ 455/456.1; 455/558; 455/456.5; 455/456.6

(58) Field of Classification Search
USPC ............................ 455/456.1, 558
See application file for complete search history.

(56) References Cited

U.S. PATENT DOCUMENTS

| 6,092,133 A | 7/2000 | Erola et al. | |
|---|---|---|---|
| 6,178,324 B1 | 1/2001 | Choquet et al. | |
| 2006/0099992 A1 | 5/2006 | Ju | |
| 2007/0155400 A1 * | 7/2007 | Madsen | 455/456.1 |
| 2008/0305810 A1 | 12/2008 | Lee | |
| 2010/0248748 A1 * | 9/2010 | Dong | 455/456.6 |

OTHER PUBLICATIONS

"Digital cellular telecommunications system (Phase 2+); Specification of the SIM Application Toolkit for the Subscriber Identity Module-Mobile Equipment (SIM-ME) interface (3GPP TS 51.014 version 4.5.0 Release 4) . . . ", ETSI Standards, vol. 3-T3, No. V4.5.0, Dec. 1, 2004, XP014028445.

"Digital cellular telecommunications system (Phase 2+); Universal Mobile Telecommunications System (UMTS); Universal Subscriber Identity Module (USIM) Application Toolkit (USAT) (3GPP TS 31.111 version 8.3.0 Release 8) . . . ", vol. 3-T3, No. V8.3.0, Oct. 1, 2008, XP014042588.

"Smart Cards; Card Application Toolkit (CAT) (Release 8); ETSI TS 102 223", ETSI Standard, European Telecommunications Standards Institute (ETSI), vol. SCP-WG3, No. V8.1.0, Oct. 1, 2008, XP014042333.

\* cited by examiner

*Primary Examiner* — Timothy Pham
(74) *Attorney, Agent, or Firm* — Birch, Stewart, Koslash & Birch, LLP

(57) ABSTRACT

A method and device for providing location information to a smart card, are discussed. According to an embodiment, the invention provides a mobile terminal for communicating with a smart card and a location device associated with the mobile terminal, the mobile terminal comprising: a controller configured to provide terminal profile information to the smart card, to receive a geographical location request from the smart card based on the terminal profile information, to send a terminal response to the smart card in response to the geographical location request, to obtain location information of the mobile terminal from the location device in response to the geographical location request, and to sending an envelope signal including the obtained location information to the smart card.

16 Claims, 4 Drawing Sheets

METHOD AND APPARATUS FOR OBTAINING LOCATION INFORMATION USING SMART CARD

This application claims the priority benefits of U.S. Provisional Application No. 61/140,059 filed on Dec. 22, 2008, the entire contents of which are herein incorporated by reference.

BACKGROUND OF THE INVENTION

1. Field of the Invention

The present invention relates to a method and apparatus for obtaining location information using a smart card.

2. Discussion of the Related Art

Mobile terminals such as smart phones, etc. are being developed with the increased capabilities for providing various services and functionalities which are user-friendly. Among the capabilities, the mobile terminal may include a removable storage device such as a smart card (e.g., a SIM (Subscriber Identity Module) card or USIM (Universal Subscriber Identity Module) card), which stores data, which can be read contactlessly by an external contactless reader. The smart cards generally use a UICC (Universal Integrated Circuit Card) platform that supports telecommunication applications.

In addition to the mobile terminals, other peripheral devices have also gained much popularity. For instance, a GPS device which can be installed in a vehicle or other locations can provide accurate and current geographical location information of an entity (e.g., vehicle) at which the GPS device is installed. However, when the GPS device is connected to the mobile terminal 100, the location information provided by the GPS device can not be proactively requested or obtained by the smart card associated with the mobile terminal. This is because there is no defined interface for providing the smart card and smart-card based applications with the location information generated by the GPS device.

SUMMARY OF THE INVENTION

The present invention provides a mobile terminal and method for providing location information supplied by a GPS device to a smart card associated with the mobile terminal.

The present invention also defines and provide interfaces for providing a smart card and smart-card based applications with location information generated by a GPS device via a mobile terminal.

The present invention also provides a mobile terminal and method for providing location information supplied by a GPS device to a smart card associated with the mobile terminal in compliance with the existing standards.

The present invention further provides a mobile terminal and method for providing location information generated by a GPS device, which address the limitations and disadvantages associated with the related art.

According to one aspect, the present invention provides a mobile terminal for communicating with a smart card and a location device associated with the mobile terminal, the mobile terminal comprising: a controller configured to provide terminal profile information to the smart card, to receive a geographical location request from the smart card based on the terminal profile information, to send a terminal response to the smart card in response to the geographical location request, to obtain location information of the mobile terminal from the location device in response to the geographical location request, and to sending an envelope signal including the obtained location information to the smart card.

According to one aspect, the present invention provides a method of providing location information using a mobile terminal, the mobile terminal configured to communicate with a smart card and a location device, the method performed by the mobile terminal and comprising: providing terminal profile information to the smart card; receiving a geographical location request from the smart card based on the terminal profile information; sending a terminal response to the smart card in response to the geographical location request; obtaining location information of the mobile terminal from the location device in response to the geographical location request; and sending an envelope signal including the obtained location information to the smart card.

According to one aspect, the present invention provides a smart card for communicating with a mobile terminal, the smart card comprising: a controller configured to receive terminal profile information from the mobile terminal, to send a geographical location request to the mobile terminal based on the received terminal profile information, to receive a terminal response from the mobile terminal in response to the geographical location request, and to receive an envelope signal including location information of the mobile terminal from the mobile terminal in response to the geographical location request.

According to another aspect, the present invention provides a method of providing location information to a smart card, the smart configured to communicate with a mobile terminal, the method performed by the smart card and comprising: receiving terminal profile information from the mobile terminal; sending a geographical location request to the mobile terminal based on the received terminal profile information; receiving a terminal response from the mobile terminal in response to the geographical location request; and receiving an envelope signal including location information of the mobile terminal from the mobile terminal in response to the geographical location request.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF EXEMPLARY EMBODIMENTS

Hereinafter, exemplary embodiments of the invention will be described in detail with reference to the attached drawings. The embodiments described below are intended to exemplify the technical spirit of the invention, but are not intended to limit the scope of the invention.

Figure 1:
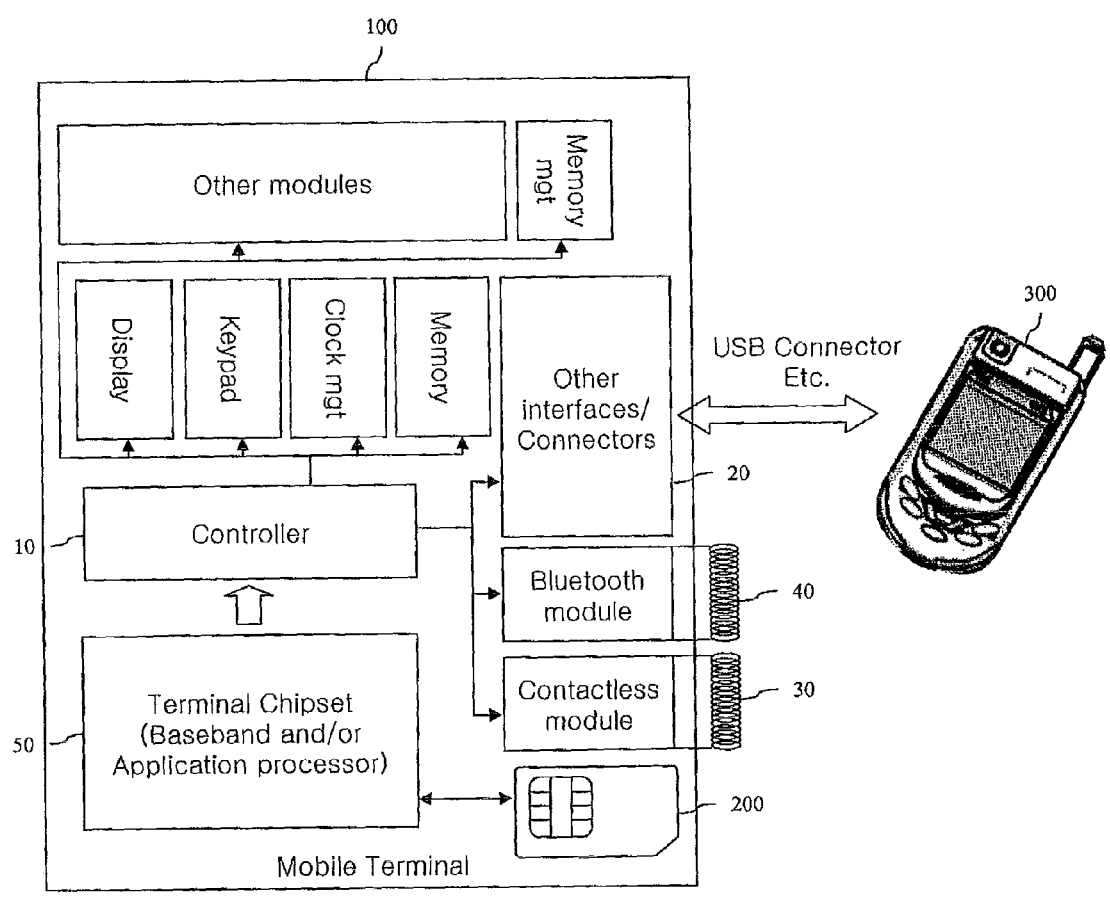
FIG. 1 is a block diagram of a mobile terminal configured to communicate an external GPS device according to an embodiment of the invention.

FIG. 1 is a block diagram of a mobile terminal 100 configured to communicate with a GPS device 300 according to an embodiment of the invention. The mobile terminal 100 may be, e.g., a mobile equipment (ME), smart phone, pager, PDA (Personal Digital Assistant), UE (user equipment), mobile phone, etc. The GPS device 300 can be any location device that is externally provided from the mobile terminal 100, for calculating and/or obtaining various location information. The GPS device 300 shown in FIG. 1 (and in FIG. 3) is illustrates merely one example of the GPS device, and the invention is not limited thereto.

Referring to FIG. 1, the mobile terminal 100 includes a controller 10, a contactless module/reader 30 for contactlessly communicating with an external device having a contactless module/reader, a removable storage device or smart card (UICC) 200 (e.g., SIM card, USIM card, ISIM card, etc.) for storing and executing data and applications, a Bluetooth module 40 for providing Bluetooth communication with an external device, other interfaces/connectors 20 such as USB connector, and a terminal chipset (e.g., baseband and/or application processor) 50 for controlling communication with the smart card 200. The controller 10 controls all components of the mobile terminal 100. The contactless module 30 preferably includes a contactless reader such that the contactless module 30 can send and receive data contactlessly to and from another component or external device having a contactless module. The GPS device 300 can be connected to the mobile terminal via various connectors 20, 30, 40 such as the USB connector, Bluetooth module, infrared interface, WiFi connector, short range communication connector, etc. The terminal chipset 50 communicates with the controller 100 and the storage device 200, and can communicate with each component of the mobile terminal 100 via the controller 10.

The mobile terminal 100 can further include known components such as a display unit, an input unit such as a keypad or touch screen, a clock, a clock management unit, storage unit(s) such as memory, a memory management unit, a battery, a power management unit for supplying power (AC, battery, etc.), other local communication device(s), a speaker, a network interface (e.g., for communicating with a server or other network entity), a transceiver for receiving and/or transmitting signals, a secure element for providing added security to data and applications related to contactless services (e.g., via encryption/decryption or other security enhancing applications), etc. The secure element can be part of the storage device 200 and can be implemented using UICC (smart card platform). The secure element can also be based on a secured hardware part of the mobile terminal 100. The other local communication device can be a short range communication unit such as a WiFi device, an IRDA (infrared data association) device, etc. for providing short distance communications between the mobile terminal 100 with other device(s).

The removable storage device 200 can also be inserted in the mobile terminal 100 or otherwise connected with the mobile terminal 100. The storage device 200 may include components such as a memory, a secure element, a controller for controlling the storage device 200.

All the components of the mobile terminal 100 and other devices of FIG. 1 are operatively coupled and configured. Further, depending on the desired need and configuration, some of the components of the mobile terminal 100 may be optionally provided.

As shown in the example of FIG. 1, the GPS device 300 can be an external device connected to the mobile terminal 100. In other examples, the GPS device 300 can be integrated into the mobile terminal 100. An example of the GPS device 300 integrated into the mobile terminal 100 is shown in FIG. 2.

Figure 2:
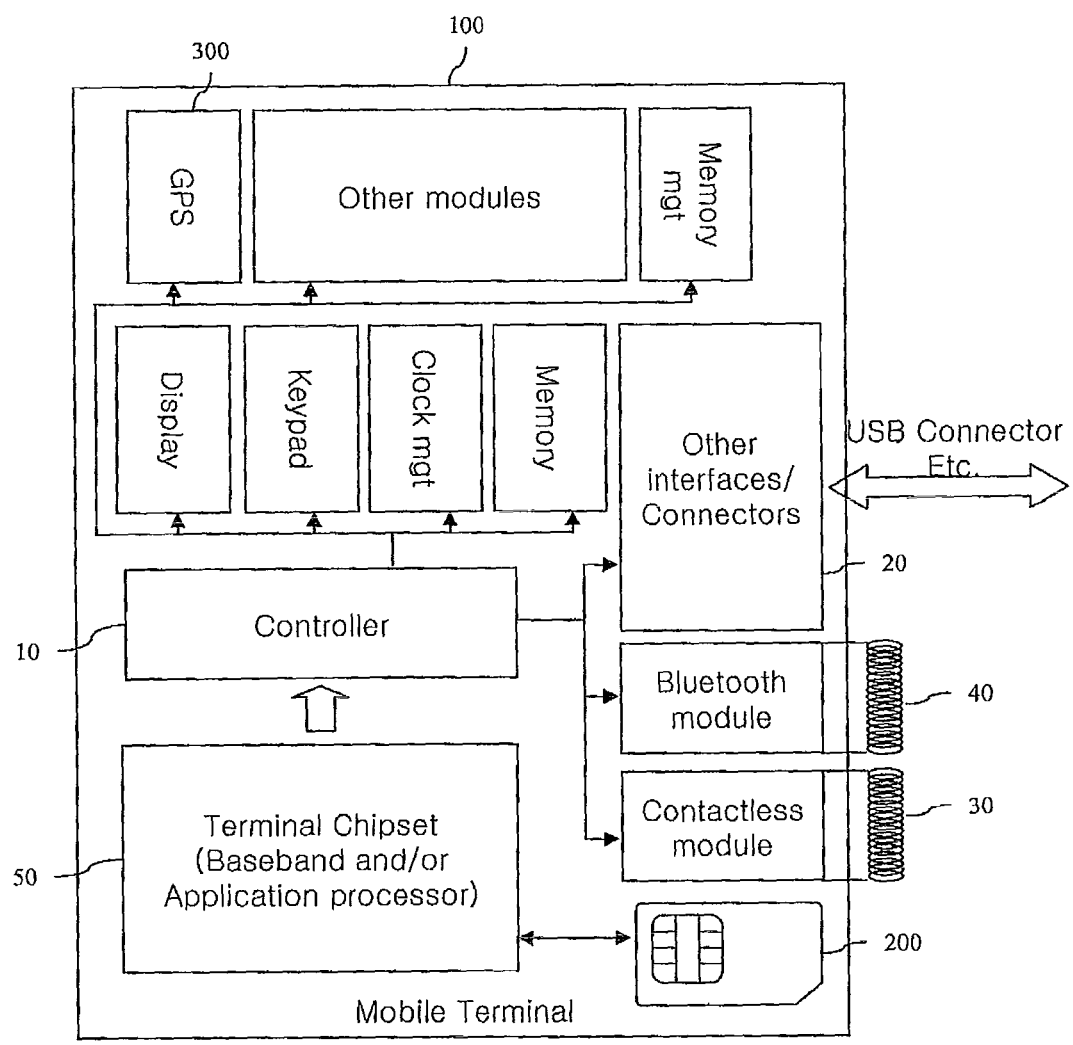
FIG. 2 is a block diagram of a mobile terminal including a GPS device integrated therein according to an embodiment of the invention.

FIG. 2 is a block diagram of a mobile terminal including a GPS device integrated therein according to an embodiment of the invention. As shown in FIG. 2, the GPS device 300 having a GPS chip, antenna, etc. can be installed in the mobile terminal 100 to provide location services as part of the services provided by the mobile terminal 100. As integral part of the mobile terminal 100, the GPS device 300 can be operated under control of the controller 10. The mobile terminal 100 of FIG. 2 includes other components such as one or more components of the mobile terminal 100 shown in FIG. 1. All the components of the mobile terminal 100 of FIG. 2 are operatively coupled and configured. Further, depending on the desired need and configuration, some of the components of the mobile terminal 100 may be optionally provided.

Although the GPS device 300 can be an autonomous external GPS device connected to the mobile terminal as shown in FIG. 1 or an autonomous internal GPS device of the mobile terminal as shown in FIG. 2 according to the invention, the present invention is not limited thereto and is equally applicable to other types such as Assisted GPS device (GPS-A), Assisted GNSS, etc. That is, the GPS device 300 hereinafter refers to any one of these devices/modules.

Now, methods of providing location information generated by the GPS device 300 to the smart card (removable storage device) 200 associated with the mobile terminal 100 will be discussed referring to FIGS. 3 and 4 according to embodiments of the invention. These methods are preferably implemented in the devices of FIGS. 1 and 2, but can be implemented in other suitable devices/system.

Figure 3:
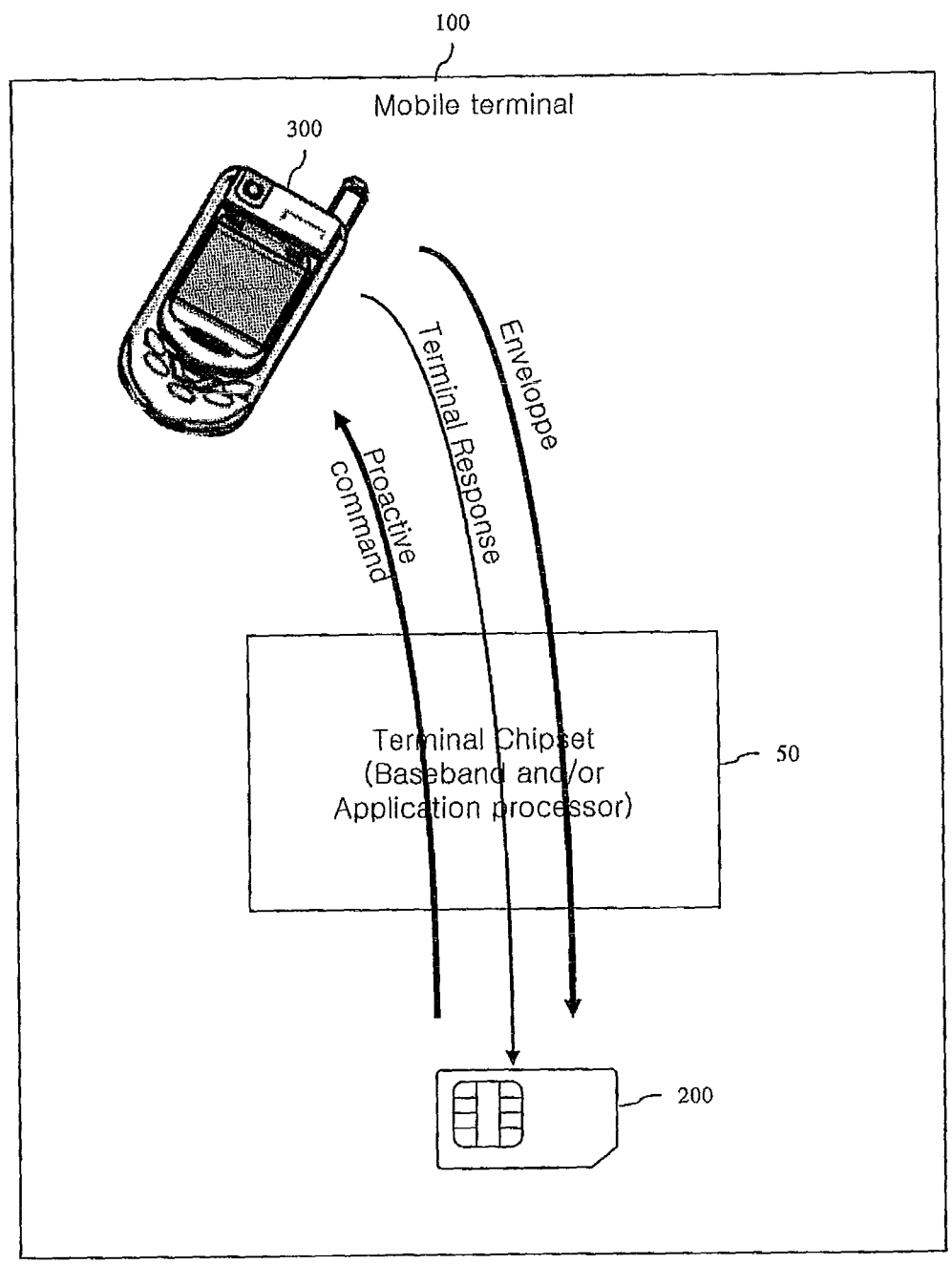
FIG. 3 is a diagram illustrating communication between a smart card and a GPS device via a mobile terminal according to an embodiment of the invention.

FIG. 3 is a diagram illustrating communication between the smart card (UICC) 200 and the GPS device 300 via the mobile terminal 100 according to an embodiment of the invention.

First, to implement the embodiments of the invention in compliance with the existing standards including ETSI (European Telecommunication Standard Institute) TS (Technical Specification), the inventor proposes a new 'letter class' (e.g., letter "m" or "x" or any other available letter) to be created and added to the existing letter class list, as shown below in Table A. The principle of a letter class is to ensure that if the service is implemented, it is actually completely implemented and following the standards specification. The letter class list is provided in ETSI Common Application Toolkit specification, ETSI TS 102 223. Although Table A shows the new letter class "m" as part of the letter class list defined in ETSI TS 102 223, this is merely an example and another letter class can be added and designated for the GPS service.

As shown in Table A, according to the invention, the new letter case "m" in the letter class list refers to 3G specification TS 31.111 (USIM Application Toolkit). This indicates that the newly added letter class is defined and used according to 3G TS 31.111 which is discussed below. The other letter cases 'a'-'l' are known commands, which are not directly related to the invention, and are thus not discussed for the sake of brevity.

TABLE A

| Letter classes | Command/function description |
|---|---|
| a | Proactive command: GET READER STATUS |
|   | Proactive command: PERFORM CARD APDU |
|   | Proactive command: POWER ON CARD |
|   | Proactive command: POWER OFF CARD |
|   | Event download: Card reader status |
| b | Proactive command: RUN AT COMMAND |
| c | Proactive command: LAUNCH BROWSER |
|   | Event download: Browser termination event |
|   | Event download: Browsing status event |
| d | Soft key support |
| e | Proactive command: OPEN CHANNEL |
|   | Proactive command: CLOSE CHANNEL |
|   | Proactive command: RECEIVE DATA |
|   | Proactive command: SEND DATA |
|   | Proactive command: GET CHANNEL STATUS |
|   | Event download: Data available |
|   | Event download: Channel status |
| f | Proactive command: SERVICE SEARCH |
|   | Proactive command: GET SERVICE INFORMATION |
|   | Proactive command: DECLARE SERVICE |
|   | Event download: Local connection event |
| g | Proactive Command: PROVIDE LOCAL INFORMATION (Battery State) |
| h | Multi-media Call support |
| i | Proactive command: SET FRAMES |
|   | Proactive command: GET FRAMES STATUS |
|   | Event download: Frames Information changed |
| j | Proactive command: RETRIEVE MULTIMEDIA MESSAGE |
|   | Proactive command: SUBMIT MULTIMEDIA MESSAGE |
|   | Proactive command: DISPLAY MULTIMEDIA MESSAGE |
|   | Envelope command: MMS notification download |
|   | Event download: MMS Transfer status |
| k | Envelope command: TERMINAL APPLICATIONS |
| l | Proactive command: ACTIVATE |
| m | See 3G TS 31 111 [26] |

Further, according to the invention, the mobile terminal 100 stores therein, e.g., in its memory, terminal profile information. The terminal profile information can identify capabilities and other information about the mobile terminal 100, and preferably includes a 1-bit information indicating whether or not the mobile terminal 100 has the ability to provide the location information from the GPS device 300 (GPS service) to the smart card 200. For example, the 1-bit information (or any other size information) can be added to any byte (e.g., $30^{th}$ byte or other byte) of a TERMINAL PROFILE, which is an example of the terminal profile information and is defined in the standards document, ETSI TS 102 223 §5.2. Thus, for instance, when the mobile terminal is turned on or whenever a new session is opened, the smart card 200 can receive this terminal profile information (e.g., TERMINAL PROFILE stored in the mobile terminal 100) from the mobile terminal 100 or can access this terminal profile information from the mobile terminal 100, and then check or determine whether or not the current mobile terminal 100 can provide the GPS service from the GPS device 300 to the smart card 200. If so, then the processes as shown in FIGS. 3 and 4 can be performed.

More specifically, according to an embodiment of the present invention, the inventor proposes to modify the TERMINAL PROFILE (as defined in the standards document, ETSI TS 102 223 §5.2) to include information indicating whether the mobile terminal 100 supports the GPS service (e.g., providing the location information from the GPS device 300 to the smart card 200). This information can be preferably one-bit information, and allows the smart card 200 to determine whether or not the mobile terminal 100 associated with the smart card 200 has the ability to provide the GPS service or location service to the smart card 200.

For example, in the thirtieth byte of the TERMINAL PROFILE for the mobile terminal 100, the one-bit information pertaining to the GPS service can be provided in the eighth bit as follows:

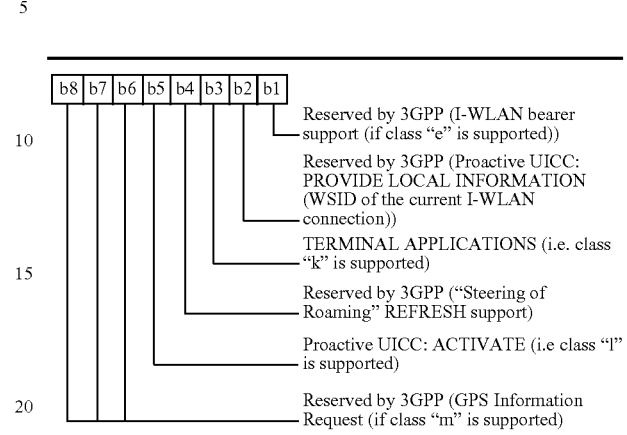

The above example is merely one example, and the invention encompasses other variations. For instance, the information regarding the GPS service capability can be provided in any other bit (e.g., sixth bit) of the thirtieth byte of the TERMINAL PROFILE or in any bit in any other byte of the TERMINAL PROFILE. For instance, the information regarding the GPS service capability can be stored at the fifth bit of the twenty third byte of the TERMINAL PROFILE. This one-bit information can have a value of 1 indicating that the mobile terminal supports the GPS service or 0 indicating that the mobile terminal does not support the GPS service. Other values or parameter type can also be used.

The smart card (UICC) 200 inserted in (or connected in other manner to) the mobile terminal 100 can operate as a slave device in accordance with the direction of the master device, which is the mobile terminal 100. As such, data can be stored in the smart card and can be accessed by the mobile terminal 100. As an enhanced variation, the smart card 200 is further configured to make the smart card proactive in the mobile terminal 100 using a set of commands that can be sent from the smart card 300 to the terminal chipset 50 of the mobile terminal 100. This set of commands is known as SIM (or USIM) Application Toolkit which is specified in telecommunication standards documents including, e.g., 3G TS 31.111 and 3G TS 51.014. The generic part of these commands, which may not be specific to telecommunications, is also known as Card Application Toolkit which is specified in standards documents including, e.g., ETSI TS 102 223.

According to the invention, a new command (proactive command such as GPS Information Request) for requesting location information provided by the GPS device 300 is provided and added to the Application Toolkit commands, such that the smart card 200 can now proactively request and receive the location information from the GPS device 300. For example as shown in FIG. 3, if the smart card 200 has determined that the mobile terminal 100 provides the GPS service based on the terminal profile information such as the TERMINAL PROFILE received from the mobile terminal 100, the smart card 200 can generate and send a proactive command (e.g., GPS Information Request or the like) for requesting location information to the GPS device 300 (e.g., internal or external or other type) through the terminal chipset 50 of the mobile terminal 100. Here the name 'GPS Information Request' is merely an example and instead, another name such as Geographical Location Request or the like may be used. The invention encompasses all variations in the naming of this request and other commands. In some cases, multiple GPS Information Requests can be sent from the smart card 200 to the mobile terminal 100. Then in response, the GPS device 300 (or the controller 10) can generate and send a response message/command such as a Terminal Response which provides information on how the request has been processed (e.g., the request has been successfully performed or there was an error), to the smart card 200, e.g., via the terminal chipset 50. The GPS device 300 (or the controller 10) can also generate and send an envelope command such as an Envelope for providing the requested location information from the GPS device 300 to the smart card 200 through the terminal chipset 50. The requested location information can be the current geographical location information of the GPS device 300/mobile terminal 100, and can be provided in any format. For instance, the location information from the GPS device 300 can be provided to the smart card 200 in one of the following known forms: (1) GAD as defined in TS 23.032, or (2) NMEA sentences defined in ISO/IEC 61162-1.

Now, more details on these commands are discussed.

The smart card 200 may request a preferred quality of service depending on the mobile terminal 100's level of support for the GPS service. This request can be part of the parameters of the GPS Information Request (or the like as designated). The quality of service (e.g., type of information to be received) here can be defined as follows:
1. A minimum set of location information to be provided is basically horizontal coordinates (e.g., latitude and longitude data), and/or
2. Additional geographical location information can be provided, including
   a. Vertical Coordinate data (e.g., this can indicate how high the mobile terminal 100 is currently positioned, e.g., on top of a tall building), and/or
   b. speed (e.g., velocity—this can indicate the moving speed of the mobile terminal 100, e.g., how fast the mobile terminal 100 is moving).

For instance, the smart card 200 can include in the GPS Information Request (or the like) a request to provide at least one of the above information when providing the location information from the GPS device 300.

In cases where multiple GPS Information Requests (for instance, by several different applications within the smart card 200) are received by the mobile terminal 100, according to an embodiment, only the last GPS Information Request received may be processed by the mobile terminal 100.

Table B shows one example of how the GPS Information Request (or the like as designated) can be defined in the standards documents such as 3G TS 31.111. This is merely an example and is provided below only to illustrate one example of adoption of this Request into the existing standards. The format shown in Table B is well known to one skilled in these standards.

TABLE B

GPS Information Request description

| Description | Clause | M/O/C | Min | Length |
|---|---|---|---|---|
| Proactive UICC command Tag | 9.2 | M | Y | 1 |
| Length (A + B + C) | — | M | Y | 1 or 2 |
| Command details | xx | M | Y | A |
| Device Identities | xx | M | Y | B |
| Geographical Location Parameters | xx | M | N | C |

In Table B above, the parameters (e.g., 'Geographical Location Parameters) include the preferred information requested by the smart card 200 (in relation with the requested quality of service). Further, in the request (e.g., GPS Information Request or the like), the smart card 200 identifies a specific level of service required or preferred, which may include, for example:
  preferred or required horizontal accuracy (e.g., desired or required level of accuracy of the horizontal coordinates), and/or
  preferred or required vertical accuracy (e.g., desired or required level of accuracy of the vertical coordinates), and/or
  preferred or required speed/velocity (e.g., desired or required level of accuracy of the speed or velocity information).
  Further, for each of the parameters (e.g., 'Geographical Location Parameters) in Table B, values can be set as:
  'aa': not specified,
  'bb': best effort,
  'xx': given value of the uncertainty.
Obviously, other values can be used.

Additionally, Geographical Location Parameters in Table B can specify at least one of the following:
  Preferred GAD shapes,
  Preferred NMEA sentences, or
  Preferred maximum response time (e.g., this information can indicate a maximum value for a preferred or required response time for the location request such as GPS Information Request).

The command, Terminal Response, provides a response to the location request (e.g., GPS Information Request, Geographical Location Request, or the like as designated) to the smart card 200. This response can include error information based on various factors such as the capabilities of the mobile terminal, network status, GPS device status, etc. For instance, the error information can indicate that an error occurred due to one of the following reasons:
  No support of the GPS service feature,
  No location information acquired by the GPS device,
  GPS device being deactivated,
  Mobile terminal cannot process the command for internal reasons,
  Etc.

Instead of the error information, the Terminal Response can also acknowledge the location request and alert the smart card 200 to expect receipt of data (e.g., location information) through an envelope command such as 'Envelope(GPS Information Request)' or Envelope(Geographical Location Request).

As an example, Table C below provides possible answers, one or more of which can be provided in the Terminal Response according to the format of 3G TS 31.111. For instance, the Terminal Response can include information indicating 'command performed successfully', 'command performed with partial comprehension', 'command performed with missing information', 'no response from user', 'ME (mobile terminal or mobile equipment) currently unable to process command', 'network currently unable to process command', 'user did not accept the proactive command', 'command beyond MEs capabilities', 'command type not understood by ME', 'command data not understood by ME', 'command number not known by ME', or 'error, required values are missing'. Other information can also be indicated or included by the Terminal Response.

TABLE C

Terminal Response description

| TERMINAL RESPONSE | GPS Information Request 'xx' |
|---|---|
| 00 Command performed successfully | • |
| 01 Command performed with partial comprehension | • |
| 02 Command performed, with missing information | • |
| 03 REFRESH performed with additional EFs read | |
| 04 Command performed successfully, but requested icon could not be displayed | |
| 05 Command performed, but modified by call control by USIM | |
| 06 Command performed successfully, limited service | |
| 07 Command performed with modification | |
| 08 REFRESH performed but indicated USIM was not active | |
| 09 Command performed successfully, tone not played | |
| 10 Proactive UICC session terminated by the user | |
| 11 Backward move in the proactive UICC session requested by the user | |
| 12 No response from user | • |
| 13 Help information required by the user | |
| 14 USSD or SS Transaction terminated by user | |
| 20 ME currently unable to process command | • |
| 21 Network currently unable to process command | • |
| 22 User did not accept the proactive command | • |
| 23 User cleared down call before connection or network release | |
| 24 Action in contradiction with the current timer state | |
| 25 Interaction with call control by USIM, temporary problem | |
| 26 Launch browser generic error | |
| 27 MMS Temporary Problem | |
| 30 Command beyond MEs capabilities | • |
| 31 Command type not understood by ME | • |
| 32 Command data not understood by ME | • |
| 33 Command number not known by ME | • |
| 34 SS Return Error | |
| 35 SMS RPERROR | |
| 36 Error, required values are missing | • |
| 37 USSD return error | |
| 38 Multiple Card command error | |
| 39 Interaction with call/SM control by USIM, permanent problem | |
| 3A Bearer Independent Protocol error | |
| 3B Access Technology unable to process command | |
| 3C Frames error | |
| 3D MMS Error | |

The envelope command, e.g., Envelope(GPS Information Request), Envelope(Geographical Location Request), or the like, can be structured as defined below. For instance, it can include data for the GPS device, either GAD profiles or NMEA information/sentences according to the ISO specifications. Table D shows one example of how the Envelope (GPS Information Request) or the like as designated can be defined in the standards documents such as 3G TS 31.111. This is merely an example and is provided below only to illustrate one example of adoption of this envelope command into the existing standards. The format shown in Table D, which is similar to that of Table B, is well known to one skilled in these standards.

TABLE D

Envelope GPS information Request description

| Description | Clause | M/O/C | Min | Length |
|---|---|---|---|---|
| Geographical Location Reporting tag | 9.1 | M | Y | 1 |
| Length (A or A + B or A + C) | — | M | Y | 1 or 2 |
| Device identities | xx | M | Y | A |
| GAD shape | xx | C | N | B |
| NMEA sentence | xx | C | N | C |

This Envelope command is sent back by the mobile terminal to the smart card 200, which then can be used by any requesting application in the smart card 200 or other component or can be stored as needed in the smart card 200 or other location in the mobile terminal 100.

Figure 4:
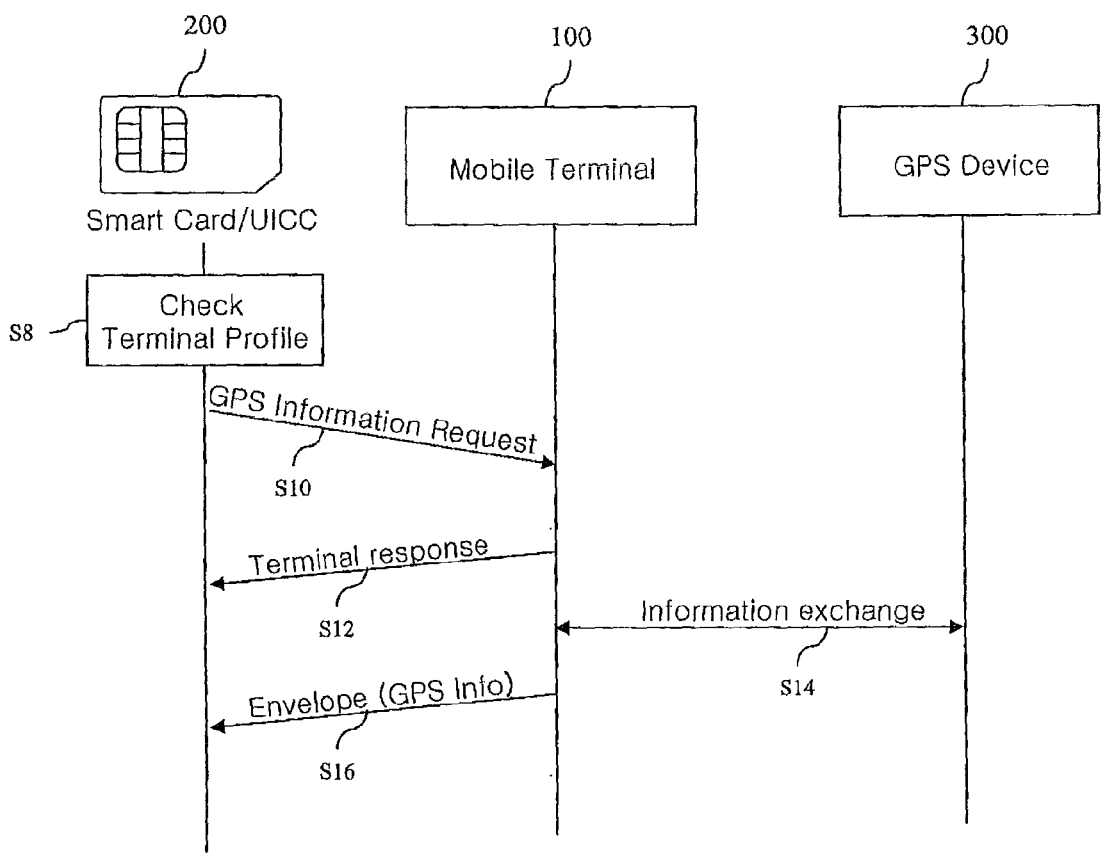
FIG. 4 is a flow diagram illustrating a method of providing geographical location information from a GPS device to a smart card via a mobile terminal according to an embodiment of the invention.

FIG. 4 is a flow diagram illustrating a method of providing geographical location information provided from the GPS device 300 to the smart card 200 via the mobile terminal 100 according to an embodiment of the invention.

Referring to FIG. 4, at step S8 the smart card 200 associated with the mobile terminal 100 accesses and checks the terminal profile information (e.g., TERMINAL PROFILE) stored in the mobile terminal 100, or receives the terminal profile information sent from the mobile terminal 100 and checks the received terminal profile information. If this information indicates that the mobile terminal 100 supports the GPS service, then the smart card 200 (e.g., controller in the smart card 200) generates and sends a GPS Information Request to the mobile terminal 100, e.g., to the terminal chipset 50, at step S10. Again, as mentioned above, the name "GPS Information Request" is merely an example of a proactive command for requesting location information, and other terms can be used according to the invention. For example, this request can be called "Geographical Location Request" or the like as mentioned. This proactive command is the new command proposed by the inventor to be added to the existing proactive commands and has been adopted into the standards documents including, e.g., ETSI TS 102 223, 3G TS 31.111 and 3G TS 51.014, which are all herein incorporated by reference.

At step S12, in response to the GPS Information Request or the like, the mobile terminal (e.g., terminal chipset 50) generates and transmits a response message such as the Terminal Response discussed above. Again the Terminal Response is merely an example and can be called differently. The Terminal Response can indicate one of various answers/response to the GPS Information Request as discussed above. For example, the Terminal Response can acknowledge the Request and alert the smart card 200 to expect receipt of data through an Envelope command, or can provide error information.

During or after step S12, the mobile terminal 100 communicates with the GPS device 300 and obtains the requested location information from the GPS device 300 at step S14. For instance, the mobile terminal 100 may obtain current geographical location information of the GPS device 300 (which would be the current geographical location information of the mobile terminal 100/smart card 200) from the GPS device 300. The GPS device 300 obtains the requested location information using known location technologies, and the requested location information can be other type of location information.

Then at step S16, the mobile terminal 100 (e.g., the mobile chipset 50) generates and sends the Envelope command which includes the obtained location information, to the smart card 200. The details of this Envelope command has been discussed above. As a result, the smart card 200 can proactively request and obtain location information from the GPS device 300 through the mobile terminal 100. Further, operators, service providers, or other entities of the smart card 200 can utilize this location information to provide more targeted services and applications to the user of the mobile terminal 100/smart card 200. For instance, based on the current location information obtained by the smart card 200 (which can be accessed by the service providers of the smart card 200) according to the invention, the service providers can load or update data and applications in the smart card 200 to be more location-specific and thus more relevant and useful to the user. In one example, according to the invention the service provider of the smart card 200 can request and receive the location information, and send targeted advertisements to the smart card 200 based on the obtained location information. And the targeted advertisements may be displayed on the display of the mobile terminal 100.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile terminal for communicating with a smart card and a location device associated with the mobile terminal, the mobile terminal comprising:
 a controller configured;
  to provide terminal profile information to the smart card;
  to receive, from the smart card, a geographical location request for acquiring a current geographical location based on the terminal profile information;
  to send a terminal response to the smart card in response to the geographical location request, the terminal response including a value indicating whether the geographical location request has been successfully processed or not; and
  to send an envelope signal including current location information obtained from the location device to the smart card if the geographical location request has been successfully processed,
 wherein the controller is further configured to process only one of multiple geographical location requests, based on a receiving order, when the multiple geographical location requests are received from the smart card, and
 wherein the terminal profile information includes:
  first information indicating that the mobile terminal does not have a unit for measuring location, or
  second information indicating that the mobile terminal has an ability to obtain geographical location information from the location device.

2. The mobile terminal of claim 1, wherein the controller is further configured to obtain the current location information of the mobile terminal from the location device.

3. The mobile terminal of claim 1, wherein the terminal response includes error information identifying an error associated with processing of the geographical location request.

4. The mobile terminal of claim 1, wherein the information indicating whether or not the mobile terminal supports a service associated with the geographical location request is one bit information.

5. The mobile terminal of claim 1, wherein the geographical location request includes parameters identifying at least one of the following:
 horizontal accuracy information;
 vertical coordinate information;
 velocity information; or
 preferred maximum response time information.

6. The mobile terminal of claim 1, wherein the controller is configured to communicate with the location device to obtain the location information.

7. The mobile terminal of claim 1, wherein the geographical location request is a proactive command configured to allow the smart card to request the current geographical location.

8. A method for communicating with a mobile terminal and obtaining location information from a location device associated with the mobile terminal, the method performed by a smart card and comprising:
 receiving, by the smart card, terminal profile information from the terminal;
 transmitting, by the smart card and to the mobile terminal, a geographical location request for acquiring current geographical location based on the terminal profile information;
 receiving, by the smart card and from the mobile terminal, a terminal response, the terminal response including a value indicating whether or not the geographical location request has been successfully processed; and
 receiving, by the smart card and from the mobile terminal, an envelope signal including current location information of the mobile terminal obtained from the location device if the geographical location request has been successfully processed,
 wherein the mobile terminal processes only one of multiple geographical location requests, based on a receiving order, when the multiple geographical location requests are transmitted to the mobile terminal, and
 wherein the terminal profile information includes first information indicating that the mobile terminal does not have the unit for measuring location, or second information indicating that the mobile terminal has an ability to obtain geographical location information from a location device connectable to the mobile terminal.

9. The method of claim 8, wherein the terminal response includes error information identifying an error associated with processing of the geographical location request.

10. The method of claim 8, wherein the terminal profile information includes one bit information indicating whether or not the mobile terminal supports a service associated with the geographical location request.

11. The method of claim 8, wherein the geographical location request includes parameters identifying at least one of the following:
 horizontal accuracy information;
 vertical coordinate information;
 velocity information; or
 preferred maximum response time information.

12. The method of claim 8, wherein the obtained location information is current geographical location information.

13. The method of claim 8, further comprising:
 determining based on the first and second information, by the smart card, whether to use the location device for obtaining location information.

14. A method for providing location information, the method performed by a mobile terminal configured to communicate with a smart card and a location device, the method comprising:
 providing terminal profile information to the smart card;
 receiving, from the smart card, a geographical location request for acquiring current geographical location based on the terminal profile information;

sending a terminal response to the smart card in response to the geographical location request, the terminal response including a value indicating whether or not the geographical location request has been successfully processed; and
sending, to the smart card, an envelope signal including current location information obtained from the location device if the geographical location request has been successfully processed,
wherein the method further includes processing only one of multiple geographical location requests, based on a receiving order, when the multiple geographical location requests are received from the smart card, and
wherein the terminal profile information includes:
first information indicating that the mobile terminal does not have a unit for measuring location, or
second information indicating that the mobile terminal has an ability to obtain geographical location information from the location device.

15. The method of claim 14, wherein the geographical location request is a proactive command and is used for allowing the smart card to request the current geographical location.

16. The method of claim 14, wherein, when multiple geographical location requests are received from the smart card, at least one of the multiple geographical location requests is processed based on a receiving order.

* * * * *